US011423046B2

(12) United States Patent
Yazdi et al.

(10) Patent No.: US 11,423,046 B2
(45) Date of Patent: Aug. 23, 2022

(54) MECHANISM FOR REPLICATION AND POPULATION OF A DATA SUBSET IN HADOOP FROM A PRIVATE NETWORK TO A PUBLIC CLOUD INSTANCE

(71) Applicant: JPMorgan Chase Bank, N.A., New York, NY (US)

(72) Inventors: Matthew Yazdi, New York, NY (US); Manish Doshi, Jersey City, NJ (US); Grant Poladian, Jersey City, NJ (US); Sachin Narhari Katakdound, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 163 days.

(21) Appl. No.: 16/423,456

(22) Filed: May 28, 2019

(65) Prior Publication Data

US 2020/0380010 A1 Dec. 3, 2020

(51) Int. Cl.
*G06F 16/27* (2019.01)
*G06F 16/182* (2019.01)

(52) U.S. Cl.
CPC .......... *G06F 16/27* (2019.01); *G06F 16/182* (2019.01)

(58) Field of Classification Search
CPC ................................ G06F 16/27; G06F 16/182
See application file for complete search history.

(56) References Cited

U.S. PATENT DOCUMENTS

| | | | |
|---|---|---|---|
| 10,547,679 B1* | 1/2020 | Burnett | H04L 67/1095 |
| 10,659,523 B1* | 5/2020 | Joseph | H04L 63/0209 |
| 10,909,143 B1* | 2/2021 | Brahmadesam | G06F 16/219 |
| 2014/0365537 A1* | 12/2014 | Zhao | G06F 3/0632 |
| | | | 707/812 |
| 2016/0179840 A1* | 6/2016 | Dani | G06F 16/1847 |
| | | | 707/824 |
| 2017/0228248 A1 | 8/2017 | Bala et al. | |
| 2017/0322954 A1 | 11/2017 | Horowitz et al. | |

OTHER PUBLICATIONS

Aug. 10, 2020 International Search Report and Written Opinion of International Searching Authority in PCT/US20/34704.

* cited by examiner

*Primary Examiner* — Charles D Adams
(74) *Attorney, Agent, or Firm* — Greenblum & Bernstein, P.L.C.

(57) ABSTRACT

Systems and methods for populating data in a client specific repository in a public cloud infrastructure is described. The system includes a private master data repository (MDR) implemented in a private network and having data stored therein. A client submits a data request to access the MDR and to perform an operation on data within the MDR. The data request may include information for identifying the client and information for determining whether the client is authorized to perform the requested operation. The system further includes a persistence mechanism configured to interface with the MDR in response to the data request. Upon verifying the client is authorized to access the MDR, the persistence mechanism may be configured to provision a directory in the public cloud infrastructure and to create and populate data in the client specific repository as a persistent state of the data in the MDR.

20 Claims, 4 Drawing Sheets

MECHANISM FOR REPLICATION AND POPULATION OF A DATA SUBSET IN HADOOP FROM A PRIVATE NETWORK TO A PUBLIC CLOUD INSTANCE

TECHNICAL FIELD

The present disclosure relates generally to a mechanism for populating data in a public cloud infrastructure from a private network and methods of using the same.

BACKGROUND

Large organizations are often tasked with the management of large amounts of data requiring secure and effective storage and retrieval. In some situations, organizations act as custodians of data for one or more clients. Certain data, such as confidential or highly confidential data, requires storage that is kept secure and isolated from networked connection so as to avoid any possibility of breach. Whenever a client of requires access to this secure data, the organization must be able to effectively and securely provide access to this data.

Data repositories, for example, master data repositories such as a Hadoop data repository, may be used to hold large sets of data for multiple subscribers within an organization's private network. However, these solutions are typically only accessible to those within the organization's network, rendering it difficult and/or impossible for the organization to provide the secure data to a client without compromising the scalability and the security of its network and/or data. Additionally, traditional mechanisms for providing access to clients for client specific data is accomplished, for example, via File Transfer Protocols (FTP) for accessing the data files, and/or direct download by the client for the client specific data. Unfortunately, each of these mechanisms have limitations related to scalability, and/or the ability to provide real-time and/or near real-time access to data.

SUMMARY

In an exemplary embodiment, a computer implemented method for populating data in a client specific repository in a public cloud infrastructure from a Hadoop master data repository in a private network is provided. The method includes the step of receiving a data request from a client to perform an operation on data in the Hadoop master data repository. The data request includes information for identifying the client and a data of the data in the Hadoop master data repository. The method further includes identifying the client from the data request and verifying that the client is authorized to access the data. The method also includes establishing a secure connection with the public cloud infrastructure upon verifying that the client is authorized to access the data. Additionally, the method includes provisioning the public cloud infrastructure to create the client specific repository in the public cloud infrastructure. The method further includes accessing the data identified in the data request. The method also includes executing a redundancy operation on the data to create a client instance of the data in a persistent state within the client specific repository, and providing access to the data in the persistent state to the client.

These and other objects, features, and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
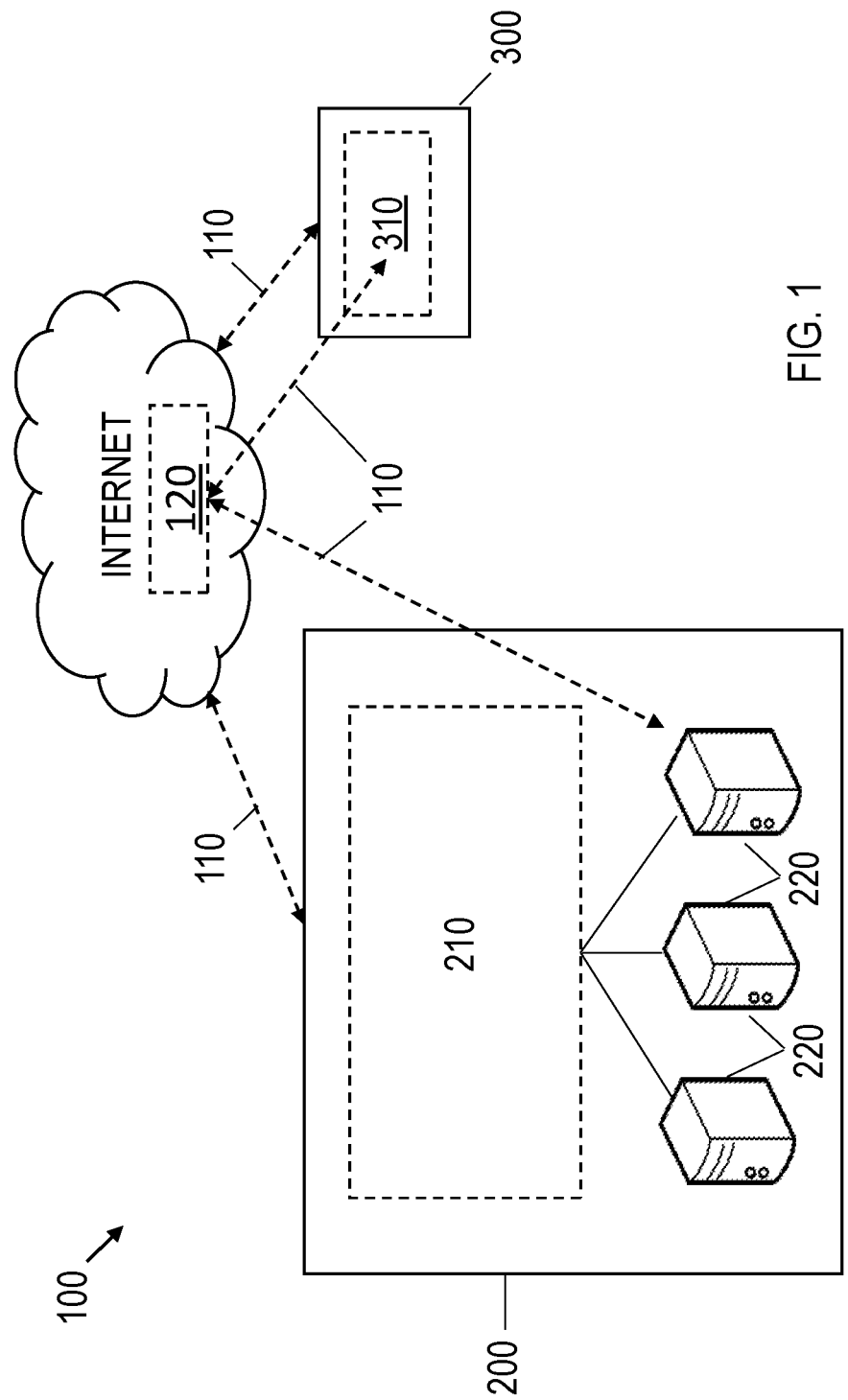
FIG. 1 illustrates an exemplary embodiment of a system in accordance with the disclosure provided herein.

Referring now to the drawings, which are for purposes of illustrating exemplary embodiments of the subject matter herein only and not for limiting the same, FIG. 1 shows an exemplary embodiment of a system 100 for populating data in a public cloud infrastructure.

An embodiment of the present disclosure is directed to a persistence mechanism operable to separate the processing of data, for example, within a data repository (e.g., a Hadoop data repository), from the persistence of the data, such that creating an instance of the data may be routed through the persistence mechanism in order to replicate the data in the Hadoop data repository in a private network to a client specific repository implemented in a public cloud infrastructure. It should be appreciated that references to Hadoop data repositories herein are for exemplary purposes only, as additional data repositories and/or master data repositories may utilize the system 100 and/or be utilized within the system 100 in a manner consistent with the reference Hadoop data repository.

As shown in FIG. 1, the system 100 may include at least a private network 200 in operable communication with a public cloud infrastructure 300 via a communication link 110. The communication link 110 may be a direct communication link, a remote communications link, or any communication link known to persons of ordinary skill in the art and configurable to allow for communication and/or interfacing between the devices and/or components of the system 100. Examples of such communication links 110 may include Local Area Networks (LAN), Wide Area Networks (WAN), and Global Area Networks (GAN) having wire or wireless branches, including, for example, the Internet. In some embodiments, communications with the public cloud infrastructure 300 may include connections via a secured connection portal 120. The secured connection portal 120 may be similar to the communication link 110 in that it may be configured to allow for a secure communication and/or interfacing between the devices and/or components within the system 100.

The system 100 may include a Hadoop data repository 210 implemented in the private network 200 for providing access to data or a subset of data within the Hadoop data repository 210 to one or more data subscribers (also referred to herein as clients) 220 within the private network 200.

The client 220 may be an individual authorized to access the Hadoop data repository 210, or in yet a further embodiment, a computer or similar device under the control of an individual authorized to access the Hadoop data repository 210 within the private network 200. It should be appreciated that the client 220 may be remote from the Hadoop data repository 210, i.e., outside of the private network 200 (FIG. 2), and may be able to access the Hadoop data repository 210 within the private network 200 via the secure connection portal 120. FIG. 1 illustrates an example of the client 220 connecting to the public cloud infrastructure 300 via the secure connection portal 120.

Figure 2:
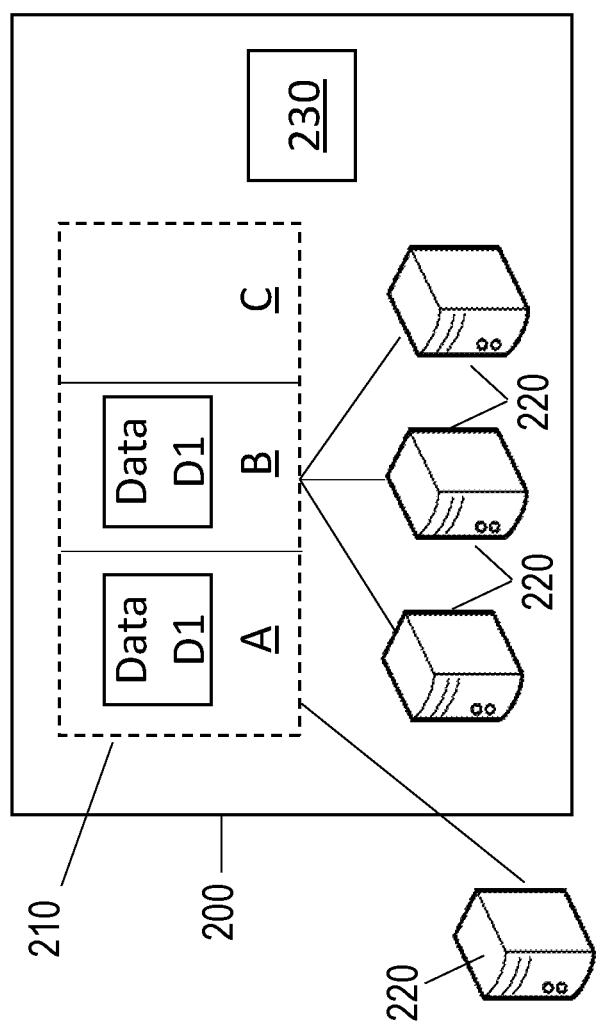
FIG. 2 illustrates an exemplary embodiment of a Hadoop data repository in a private network in accordance with the disclosure provided herein.

With continued reference to the figures, and now with additional reference to FIG. 2, an exemplary embodiment of the private network 200 with Hadoop data repository 210 is provided. As shown in FIG. 2, the private network 200 may include a client data manager 230 operably configured to interface with one or more clients 220 and the Hadoop data repository 210.

The client data manager 230 may be configured to monitor activity, for example, at the client device, within the private network 200 and between one or more clients 220 and the Hadoop data repository 210. In some embodiments, the client data manager 230 may be configured to determine whether the client is authorized to access data in the Hadoop data repository 210. The determination may be based on comparing client credentials, for example, provided by the client, to a client profile and/or an account database with authenticating information stored thereon. The client data manager 230 may access the client profile and/or the account database to compare the provided credentials to information within the client profile for determining whether the client is authorized to access data in Hadoop data repository 210.

Additionally, the client data manager 230 may be configured to deny the client access to data in the Hadoop data repository 210 upon determining that the client is not authorized, for example, based on the provided credentials. It should be appreciated that the client profile may be stored within the private network 200, and/or outside the private network 200, for example, via a data source in communication with the client data manager 230.

Additionally, or alternatively, the client data manager 230 may be configured to determine whether the client is permitted to create its own repository in the public cloud infrastructure 300. It should be appreciated that in some embodiments, determining whether the client is permitted to create its own specific repository in the public cloud infrastructure 300 may be established by the client data manager 230 when determining whether access to the Hadoop data repository 210 should be allowed and/or denied.

Additionally, or alternatively, the client data manager 230 may be configured to determine whether the client is authorized to access specific data sets within the Hadoop data repository 210. For example, the client data manager 230 may access one or more business rules to verify that the client is a holder of a specific data set and that the client is authorized to receive and/or otherwise access data for the specific data set. In some embodiments, in addition to verifying access to specific data sets, the client data manager 230 may be configured to determine whether the client is authorized to access individual data points, for example, within the specific data sets. To determine whether the client is authorized to access these data points, the client data manager 230 may be configured to access one or more data point attributes for the data points, which may include information that uniquely identifies the client's ownership of the datapoints and/or associated data sets.

Additionally or alternatively, upon authenticating the client, the client data manager 230 may further be configured to initiate the provisioning process in the public cloud infrastructure 300 to ensure the health and performance of any client specific repositories or client instances in the public cloud infrastructure 300. In some embodiments, for example, to determine the health and/or performance of one or more repositories and/or instances in the public cloud infrastructure 300, the client data manager 230 may be configured to monitor the status of one or more components, for example, forming the public cloud infrastructure 300. For example, these components may include any hardware and/or software components inside the public cloud infrastructure 300.

Additionally, or alternatively, the client data manager 230 may be configured to dynamically structure a system for the repositories and/or instances, for example, via one or more tools provided by the public cloud infrastructure 300. In this embodiment, for example, the client data manager 230 may be configured to capture a snapshot of any components of the public cloud infrastructure 300, and should one or more components become unstable, for example, due to corruption and/or changes in configurations, restore the unstable component using the captured snapshot from, for example, a stable version of the unstable component and/or a component similarly configured to the unstable component.

In some embodiments, the client data manager 230 may further be configured to apply updates and/or fixes, for example, critical updates, to any components of the public cloud infrastructure, for example, during monitoring of the public cloud infrastructure 300 and/or provisioning of the repositories and/or instances.

Additionally or alternatively, the system 100 may include a client data router, for example, within and/or in operable communication with the private network 200. The client data router may be configured to implement one or more business rules, configurations, and/or subscriptions to determine which client record is being requested in the data request. When a request to access data is identified, for example, the client data router may be configured to access and/or deliver any client specific data directly into public cloud infrastructure 300, for example, upon authenticating the client. It should be appreciated that the client data router may work with the client data manager 230, for example, upon identifying the client specific data, to confirm that the client is authorized to work in the public cloud infrastructure 300 environment.

Figure 3:
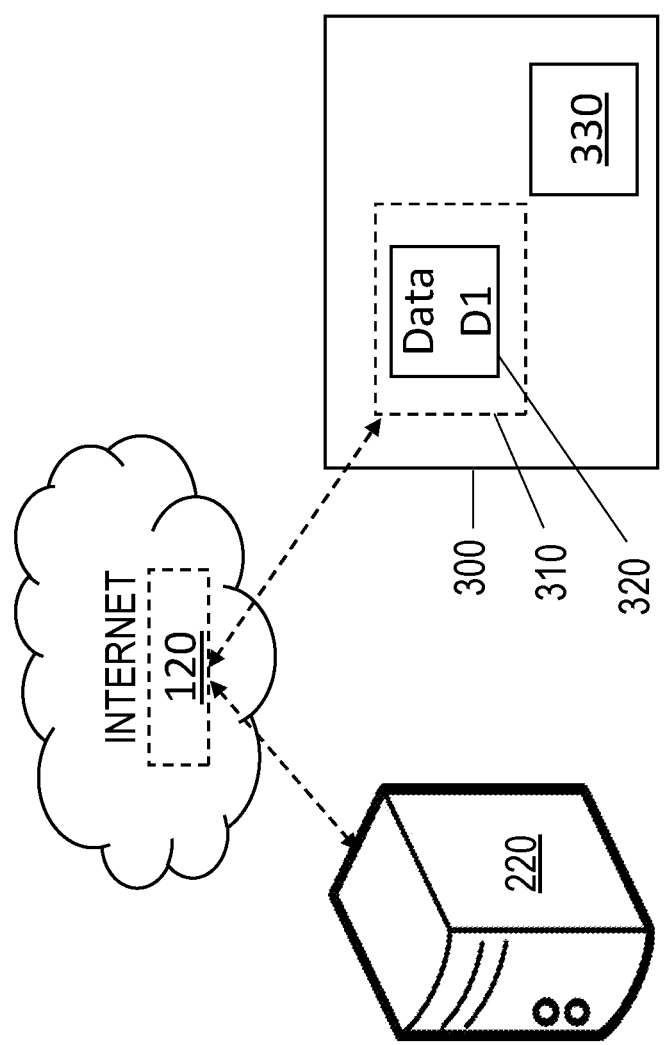
FIG. 3 illustrates an exemplary embodiment of a client specific repository in a public cloud infrastructure in accordance with the disclosure provided herein.

With continued reference to the figures, and now with additional reference to FIG. 3, an exemplary embodiment of the client specific repository 310 in a public cloud infrastructure 300 is provided. In one exemplary embodiment, the public cloud infrastructure 300 may include a client data processor 330 (also referred to as a persistence mechanism) operably configured to receive data D1 from the Hadoop data repository 210, and to populate the received data D1 in the client specific repository 310 in the public cloud infrastructure 300. The client data processor 330 may access the data in real-time or near real-time. In some embodiments, updates to the data may be applied, via the client data processor 330, in an ongoing basis creating a persistent state 320 of the data from the Hadoop data repository 210 in the client specific repository 310 in real-time or near real-time. In other embodiments, updates may be applied in a batch operation, for example, via the client data processor 330.

Figure 4:
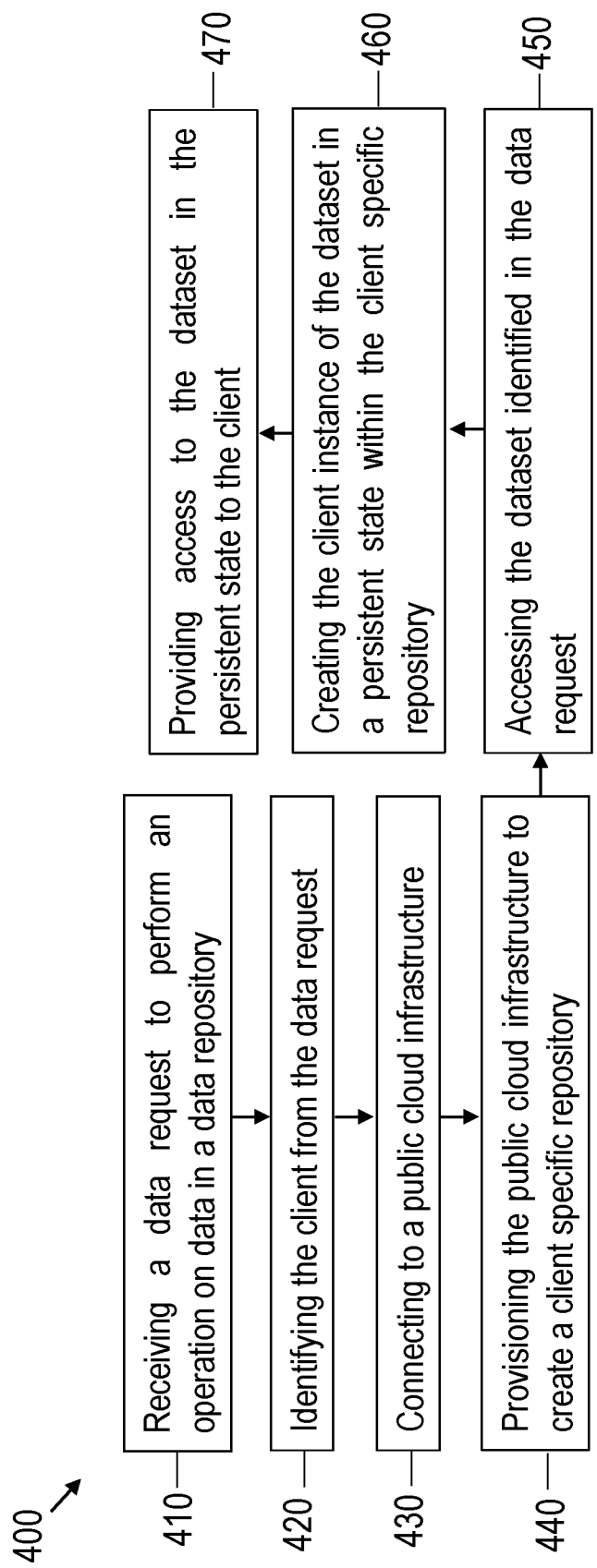
FIG. 4 illustrates a flowchart for an exemplary embodiment of a method for implementing a persistence mechanism in accordance with the disclosure provided herein.

With continued reference to the figures, and now with additional reference to FIG. 4, a method 400 for populating data in a client specific repository 310 in a public cloud infrastructure 300 from a Hadoop data repository is provided.

It should be appreciated that the method 400 may be performed in a different order, with illustrated steps omitted, with additional steps added, or with a combination of reordered, combined, omitted, or additional steps.

In step 410, the method 400 may include the step of receiving a data request from a client 220 to perform an operation on data in the Hadoop data repository 210. In this step, the client 220 may submit the data request, for example, via a user interface, to perform an operation, for example, add, remove, or update, on data or a subset of data in the Hadoop data repository 210.

In step 420, the method 400 may include the step of identifying the client 220 from the data request and verifying that the client is authorized to access at least a subset of the data (also referred to as a dataset). In this step, the submitted data request may include client information for identifying the client and/or permissions for the client.

The permissions may be provided to determine if the client is authorized to access the Hadoop data repository 210, and/or authorized to perform the operation specified in the data request. Additionally or alternatively, the permission may be provided to determine whether the client may be authorized to establish the client specific repository 310 in the public cloud infrastructure 300.

Upon identifying the client 220 and verifying that the client 220 is authorized to access and/or perform the requested operation on data in the Hadoop data repository 210, the method 400 includes the step 430 of establishing a secure connection with a public cloud infrastructure 300. In this step, a connection to the public cloud infrastructure 300 may be established so that the client data processor 330 may create the client specific repository 310 in the public cloud infrastructure 300. In some embodiments, the client data manager 230 may be configured to determine whether a connection to the components of the public cloud infrastructure 300 is authorized, and if authorized, the client data manager 230 may assist in establishing the secured communication link.

In step 440, upon establishing a connection to the public cloud infrastructure 300, the public cloud infrastructure 300 may be provisioned to create the client specific repository/directory 310 in the public cloud infrastructure 300.

In some embodiments, for example, the client data processor 330 may access one or more seed markers, via the client data router, to create the client specific repository 310. The seed markers may include and/or otherwise define various parameters, for example, for establishing structures within the public cloud infrastructure 300. For example, the client data processor 330 may be configured to interpret the information provided via one or more of the seed markers, and to establish data structures and/or granular data holders within the public cloud infrastructure 300, based on the accessed seed markers, and as desired or otherwise needed for the provisioning process and/or for creating the client specific repository 310.

Additionally, or alternatively, the information provided by the seed markers may also be utilized for updating and/or removing any existing data structures and/or granular data holders, for example, to accommodate revised data points, which may be submitted, for example, via client data manager 230. In yet a further exemplary embodiment, the information provided by the seed markers may be used for various administrative activities such as, for example, limiting or otherwise restricting the size of the client specific repository 310, optimizing the client specific repository 310 and/or miscellaneous clean-up activities.

Upon provisioning the public cloud infrastructure 300, in step 450, the data identified in the data request may be accessed in the Hadoop data repository 210 for performing the requested operation on the data in the Hadoop data repository 210. In some embodiments, the client data router may transmit any updates to the client specific data in the public cloud infrastructure 300. That is, the updates to the client specific data may occur in the public cloud infrastructure 300.

Additionally, or alternatively, any updates to the client specific data may occur in the Hadoop data repository 210. In this embodiment, for example, the client data router may provide information identifying that an update to the client specific data is available and/or has been made in the Hadoop data repository 210, and the client data processor 330 may be configured to interpret the provided information from the client data router, and update the client specific data in the client specific repository 310 based on the interpreted information.

Once the data has been updated in the Hadoop data repository 210 and/or the client specific repository 310, in step 460, the method includes the step of executing a redundancy operation on the updated data, for example, to create a client instance of the data in a persistent state 320.

In some embodiments, for example, the persistent state 320 of the data may be created in the Hadoop data repository 210 and/or the client specific repository 310 based upon where the requested operation is performed. For example, if the operation was performed in the Hadoop data repository 210, then the client instance may be created in the client specific repository 310 in the public cloud infrastructure 300.

Upon creation of the client instance, in step 470, the method includes the step of providing access to the data in the persistent state 320 to the client 220. It should be appreciated that upon creation of the client specific repository 310, the client 220 may access the client specific data directly from the client specific repository 310 instead of the Hadoop data repository 210, for example, for any future operations on the client specific data. Additionally, or alternately, once communication between the Hadoop data repository 210 and client specific repository 310 is formalized and/or initialized, all subsequent updates, for example, to the client data, may be recorded to both Hadoop data repository 210 and the client specific repository 310 in real-time or near real-time.

The term "module" or "engine" used herein will be appreciated as comprising various configurations of computer hardware and/or software implemented to perform operations. In some embodiments, modules, mechanisms, or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

It should further be understood that the terms "comprising", "including", and "having", are open-ended and does not exclude other elements or steps; and the use of articles "a" or "an" does not exclude a plurality. Accordingly, the particular arrangements disclosed are meant to be illustrative only and should not be construed as limiting the scope of the claims or disclosure, which are to be given the full breadth of the appended claims, and any and all equivalents thereof.

We claim:

1. A computer implemented method for populating data in a public cloud infrastructure comprising the steps of:
   accessing a data request via a client device to perform an operation on data in a master data repository in a private network, wherein the data request includes information for identifying the data in the master data repository;
   determining that a connection to at least one component of the public cloud infrastructure is authorized;
   establishing a secure communication link based on a result of the determining;
   connecting to the public cloud infrastructure via the secure communication link;
   creating a client specific repository in the public cloud infrastructure by:
      accessing at least one seed marker via a client data router, the at least one seed marker including at least one predetermined parameter to establish a data structure within the public cloud infrastructure, wherein the at least one predetermined parameter includes data structure information for the client specific repository;
      establishing the data structure within the public cloud infrastructure based on the accessed at least one seed marker;
      initiating at least one administrative activity based on the accessed at least one seed marker, the at least one administrative activity including a first activity that limits a size of the client specific repository, a second activity that optimizes the client specific repository, and a third activity that cleans up the client specific repository;
      provisioning the client specific repository in the public cloud infrastructure based on the established data structure and the initiated at least one administrative activity; and
      applying a software update and a software fix to the at least one component of the public cloud infrastructure based on a result of the provisioning, the software update including a critical software update to the at least one component;
   creating a client instance of the data in a persistent state within the client specific repository; and
   providing access to the client instance of the data.

2. The method of claim 1, further comprising:
   prior to creating the client specific repository, identifying a client from the data request; and
   verifying that the client is authorized to perform the requested operation by:
      accessing a client profile corresponding to the client to identify one or more client permissions; and
      identifying client permissions granting access to the data and authorizing the creation of the client specific repository in the public cloud infrastructure.

3. The method of claim 1, further comprising:
   prior to creating the client specific repository, provisioning the public cloud infrastructure by:
      determining a health of the public cloud infrastructure; and
      upon determining that the public cloud infrastructure is healthy, creating the client specific repository.

4. The method of claim 3, wherein determining the health of the public cloud infrastructure comprises:
   identifying one or more components forming the public cloud infrastructure; and
   monitoring the one or more components to identify a stable component for creating the client specific repository.

5. The method of claim 4, further comprising:
   upon identifying a stable component, creating a snapshot of the stable component for subsequently restoring unstable versions of the stable component or similarly configured components based on the snapshot.

6. The method of claim 1, further comprising:
   accessing an updated data request to perform an additional operation on the data;
   accessing the client specific repository in the public cloud infrastructure; and
   providing the client instance for performing the additional operation on the client instance.

7. The method of claim 6, further comprising:
   upon the performance of the additional operation on the client instance, executing a redundancy operation on the client instance in the client specific repository to update the data in the master data repository based on updates to the client instance from the additional operation such that the data in the master data repository replicates the client instance in the client specific repository.

8. A system for populating data in a public cloud infrastructure comprising:
   a memory including instructions for populating data stored thereon;
   a processor in communication with the memory and configured to execute the instructions to perform the following operations:
      accessing a data request to perform an operation on data in a master data repository, wherein the data request includes information for identifying the data in the master data repository;
      determining that a connection to at least one component of the public cloud infrastructure is authorized;
      establishing a secure communication link based on a result of the determining;
      connecting to the public cloud infrastructure via the secure communication link;
      creating a client specific repository in the public cloud infrastructure by:

accessing at least one seed marker via a client data router, the at least one seed marker including at least one predetermined parameter to establish a data structure within the public cloud infrastructure,
   wherein the at least one predetermined parameter includes data structure information for the client specific repository;
establishing the data structure within the public cloud infrastructure based on the accessed at least one seed marker;
initiating at least one administrative activity based on the accessed at least one seed marker, the at least one administrative activity including a first activity that limits a size of the client specific repository, a second activity that optimizes the client specific repository, and a third activity that cleans up the client specific repository;
provisioning the client specific repository in the public cloud infrastructure based on the established data structure and the initiated at least one administrative activity; and
applying a software update and a software fix to the at least one component of the public cloud infrastructure based on a result of the provisioning, the software update including a critical software update to the at least one component;
creating a client instance of the data in a persistent state within the client specific repository; and
providing access to the client instance of the data.

9. The system of claim 8, wherein the processor is further configured to execute the instructions to perform the following operation prior to creating the client specific repository:
identifying a client based on the data request;
verifying that the client is authorized to perform the requested operation by:
   accessing a client profile corresponding to the client to identify permissions for the client; and
   identifying client permissions granting access to the data and authorizing the creation of the client specific repository in the public cloud infrastructure.

10. The system of claim 8, wherein the processor is further configured to execute the instructions to perform the following operation prior to creating the client specific repository:
provisioning the public cloud infrastructure by:
   determining a health of the public cloud infrastructure; and
   upon determining that the public cloud infrastructure is healthy, creating the client specific repository in the public cloud infrastructure.

11. The system of claim 10, wherein determining the health of the public cloud infrastructure comprises:
identifying one or more components of the public cloud infrastructure; and
monitoring the one or more components to identify a healthy component for creating the client specific repository.

12. The system of claim 11, wherein the processor is further configured to execute the instructions to perform the following operation upon identifying the healthy component:
creating a snapshot of the healthy component for subsequently restoring one or more unhealthy components based on the snapshot.

13. The system of claim 8, wherein the processor is further configured to execute the instructions to perform the following operation:
accessing an updated data request to perform an additional operation on the data;
accessing the client specific repository in the public cloud infrastructure; and
providing the client instance for performing the additional operation on the client instance.

14. The system of claim 13, wherein the processor is further configured to execute the instructions to perform the following operation upon the performance of the additional operation on the client instance:
executing a redundancy operation on the client instance in the client specific repository to update the data in the master data repository based on updates to the client instance during the additional operation such that the data in the master data repository replicates the client instance in the client specific repository.

15. A non-transitory computer readable medium comprising instructions for populating data in a public cloud infrastructure that, when executed by a processor, causes the processor to perform the following operation:
accessing a data request via a client device to perform an operation on data in a private master data repository, wherein the data request includes information for identifying the data in the private master data repository;
determining that a connection to at least one component of the public cloud infrastructure is authorized;
establishing a secure communication link based on a result of the determining;
connecting to the public cloud infrastructure via the secure communication link;
creating a client specific repository in the public cloud infrastructure by:
   accessing at least one seed marker via a client data router, the at least one seed marker including at least one predetermined parameter to establish a data structure within the public cloud infrastructure,
     wherein the at least one predetermined parameter includes data structure information for the client specific repository;
   establishing the data structure within the public cloud infrastructure based on the accessed at least one seed marker;
   initiating at least one administrative activity based on the accessed at least one seed marker, the at least one administrative activity including a first activity that limits a size of the client specific repository, a second activity that optimizes the client specific repository, and a third activity that cleans up the client specific repository;
   provisioning the client specific repository in the public cloud infrastructure based on the established data structure and the initiated at least one administrative activity; and
   applying a software update and a software fix to the at least one component of the public cloud infrastructure based on a result of the provisioning, the software update including a critical software update to the at least one component;
creating a persistent state of the data identified in the data request within the client specific repository; and
providing access to the persistent state of the data.

16. The non-transitory computer readable medium of claim 15, further comprising instructions, that, when executed by the processor, causes the processor to perform the following operation:
prior to creating the client specific repository, identifying a client based on the data request; and
verifying that the client is authorized to access the data.

17. The non-transitory computer readable medium of claim 15, further comprising instructions, that, when executed by the processor, causes the processor to perform the following operation:
provisioning the public cloud infrastructure prior to creating the client specific repository.

18. The non-transitory computer readable medium of claim 17, wherein provisioning the public cloud infrastructure comprises:
determining a health of the public cloud infrastructure; and
upon determining that the public cloud infrastructure is healthy, creating the client specific repository.

19. The non-transitory computer readable medium of claim 15, further comprising instructions, that, when executed by the processor, causes the processor to perform the following operation:
accessing an updated data request to perform an additional operation on the data;
accessing the client specific repository in the public cloud infrastructure; and
providing the persistent state of the data for performing the additional operation on the persistent state of the data.

20. The non-transitory computer readable medium of claim 19, further comprising instructions, that, when executed by the processor, causes the processor to perform the following operation:
upon performance of the additional operation on the persistent state of the data in the client specific repository, executing a redundancy operation on the persistent state of the data in the client specific repository to update the data in the private master data repository based on updates to the persistent state of the data such that the data in the private master data repository replicates the persistent state of the data in the client specific repository.

* * * * *